April 8, 1969      A. R. HILDEBRANDT      3,437,968
TRANSFORMER
Filed July 3, 1968      Sheet 1 of 2
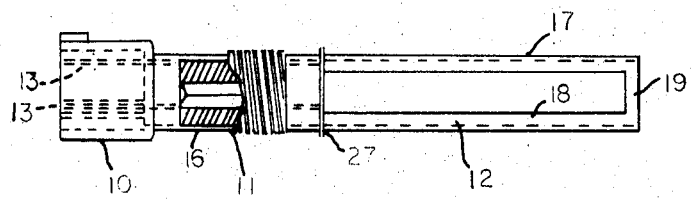
FIG. 1
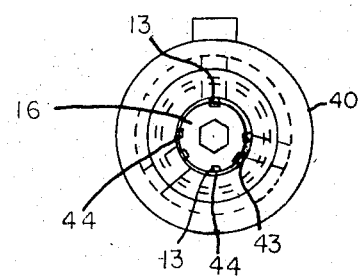
FIG. 3
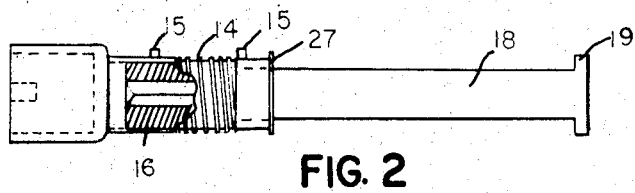
FIG. 2
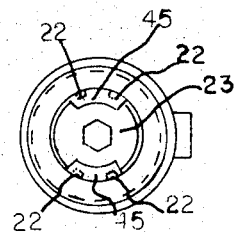
FIG. 5
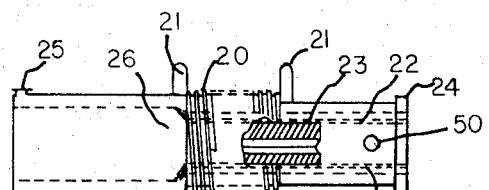
FIG. 4
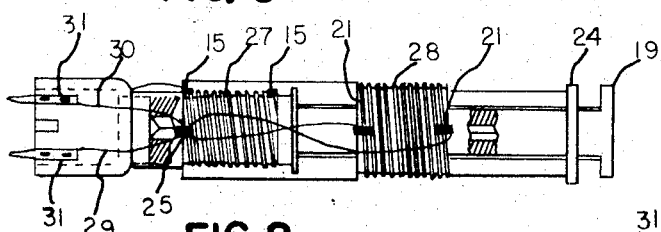
FIG. 8
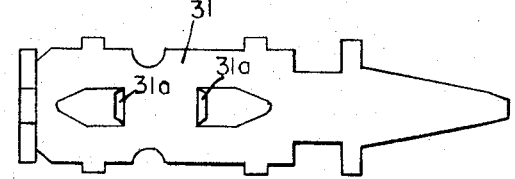
FIG. 9
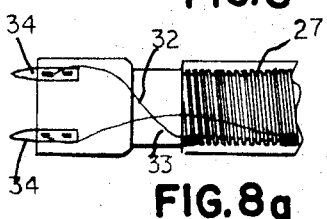
FIG. 6
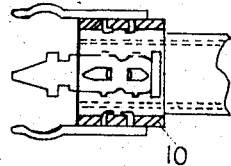
FIG. 8a
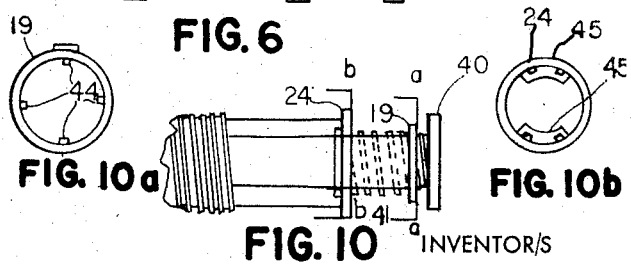
FIG. 10a    FIG. 10    FIG. 10b
FIG. 7
INVENTOR/S
ALBERT R. HILDEBRANDT
BY *Melville, Strasser, Foster and Hoffman*
ATTORNEYS

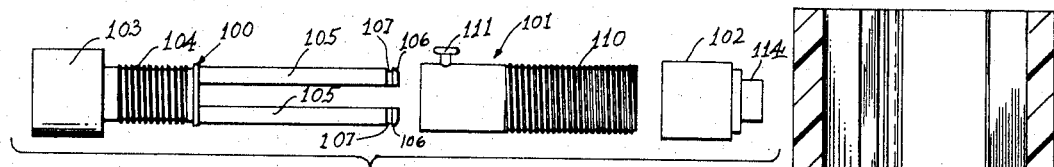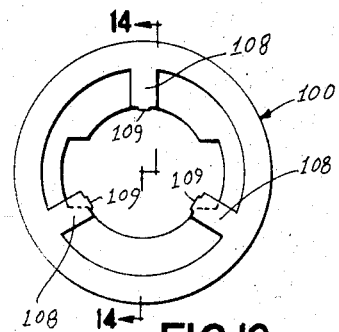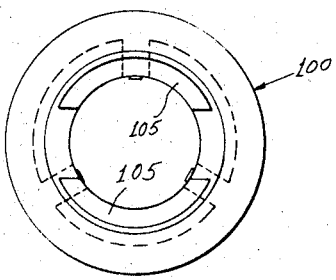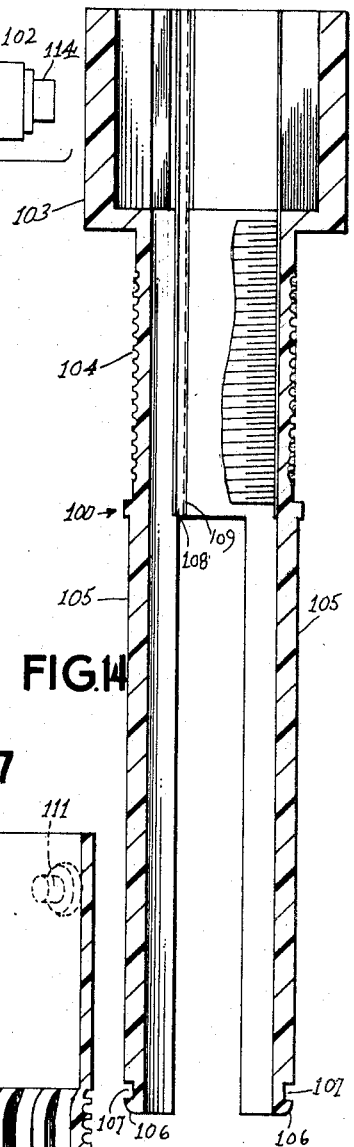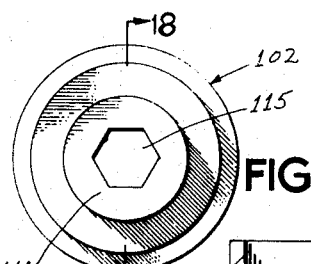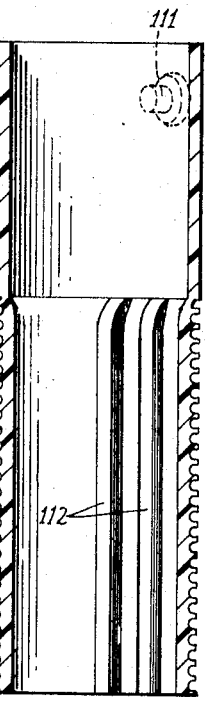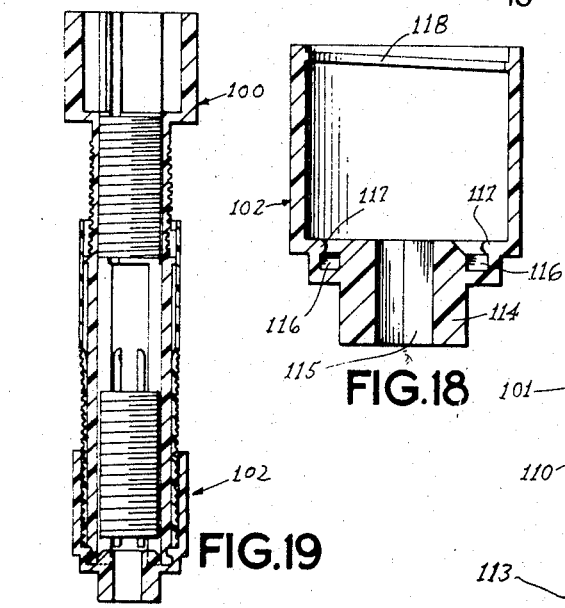

United States Patent Office 3,437,968
Patented Apr. 8, 1969

3,437,968
TRANSFORMER
Albert R. Hildebrandt, Cincinnati, Ohio, assignor to Paul Smith Inc., Cincinnati, Ohio, a corporation of Ohio
Continuation-in-part of application Ser. No. 656,841, July 28, 1967. This application July 3, 1968, Ser. No. 748,126
Int. Cl. H01f 21/06, 27/28
U.S. Cl. 336—119                14 Claims

ABSTRACT OF THE DISCLOSURE

A transformer composed of two coils each having a core capable of axial adjustment within the coil for tuning, each coil with its core being mounted on a coil form, one of which coil forms is telescopingly engaged within the other whereby the coupling of the coils may be adjusted without disturbing the tuning of each core in its respective coil.

*Cross-reference to related application*

This application is a continuation-in-part of copending application Ser. No. 656,841, filed July 28, 1967, and now abandoned.

*Background of the invention*

The invention relates to the field of small transformers such as are used principally as RF transformers in communications equipment.

Small transformers of the type to which this invention relates have heretofore been provided and they have been arranged so that the individual coils could be tuned to a particular frequency or range of frequencies by axial adjustment of an iron core in relation to the coil. Such transformers have also been arranged to permit adjustment of the coils with respect to each other in order to adjust the coupling of the coils. In the past, however, when the coils were adjusted as to their coupling, the tuning of the individual coils was disturbed since when a coil was moved the core within that coil was not moved at the same time. This meant that in the assembly of a piece of communications equipment heretofore it has been the practice to tune the individual coils and then to adjust the coupling. However, the coupling adjustment disturbed the tuning of the individual coils so that it was necessary to retune them. This procedure was therefore a "cut and try" type of procedure.

*Summary*

According to the present invention, two coil forms are provided which are arranged to telescope one within the other. A coil is wound on each coil form and within the coil supporting portion of each coil form an iron core piece is arranged. Means are provided to adjust the core piece axially of its coil. When the coil forms are telescoped, i.e., when one is moved in relation to the other, both iron cores remain in fixed relation to the coils in which they function and therefore an adjustment of the coupling of the coils does not disturb the tuning of the individual coils.

*Brief description of the drawings*

FIG. 1 is an elevational view with parts broken away and shown in cross section of one of the telescoping coil forms.

FIG. 2 is a view similar to FIG. 1 with the coil form rotated 90°.

FIG. 3 is an end elevational view on an enlarged scale taken from the right hand end of FIG. 1.

FIG. 4 is an elevational view with parts broken away and shown in cross section of the other of the two coil forms.

FIG. 5 is an end elevational view on an enlarged scale as seen from the right of FIG. 4.

FIG. 6 is a plane view on a greatly enlarged scale of a typical terminal lug.

FIG. 7 is a fragmentary cross sectional view at the left hand end of FIG. 2 showing the terminal lugs in position.

FIG. 8 is an elevational view with parts in cross section of the completed and assembled transformer.

FIG. 8a is a fragmentary view similar to FIG. 8 but rotated axially 180°.

FIG. 9 is an elevational view of an adjusting element which may be used with the transformer of FIG. 8.

FIG. 10 is an elevational view similar to the right hand end of FIG. 8 showing the adjusting screw of FIG. 9 in position.

FIG. 10a is a cross sectional view taken on the line 10a–10a of FIG. 10.

FIG. 10b is a cross sectional view taken on the line 10b–10b of FIG. 10.

FIG. 11 is an exploded view of a simplified embodiment of the invention.

FIG. 12 is an end elevational view of the left hand member of FIG. 11.

FIG. 13 is an end elevational view of the same as seen from the other end.

FIG. 14 is a greatly enlarged cross sectional view taken on the line 14—14 of FIG. 12.

FIG. 15 is an end elevational view of the central element of FIG. 11.

FIG. 16 is a greatly enlarged cross sectional view taken on the line 16—16 of FIG. 15.

FIG. 17 is an elevational view of the right hand element of FIG. 11.

FIG. 18 is a greatly enlarged cross sectional view taken on the line 18—18 of FIG. 17; and FIG. 19 is a cross sectional view of the three components in assembled condition.

*Description of the preferred embodiments*

In one embodiment, the transformer of the present invention consists basically of two members: (1) an inner coil form as shown in FIGS. 1, 2 and 3, and (2) an outer coil form as shown in FIGS. 4 and 5. These coil forms are assembled as shown in FIGS. 8 and 8a. The adjusting member of FIG. 9 may be used as shown in FIGS. 9, 10, 10a and 10b, but it need not be used and coupling may be adjusted by simply manually sliding the outer coil form of FIG. 4 over the inner coil form of FIGS. 1–3.

The inner coil form comprises an enlarged base portion 10, a coil supporting portion 11 and a cage 12. The base portion and coil supporting portions 10 and 11 are hollow and are provided with a number of longitudinal ribs 13. The outer surface of the coil supporting portion 11 may be provided with the helical groove 14 in which the wire of the coil may be seated. Heat seal elements 15 may be provided as shown in FIG. 2, so that when the wire is wound in the groove 14, a hot iron or the like may be applied to the members 15 to mash them down over the ends of the wire to hold the coil in place on the coil supporting portions. It will be understood that the coil forms herein described are made of the suitable plastic material as for example polypropylene. It is well known in the art to seal the ends of the coil as above described.

The longitudinal ribs 13, described above, are for the purpose of mounting the iron core piece 16. The iron core piece is externally threaded and is provided with a central hexagonal or other suitably shaped hole. The ribs 13 extend inwardly sufficiently so that they will intersect the threads on the outside of the core piece 16. The core piece 16 is assembled to the coil form by simply screwing it in whereby the threads on the core piece 16 cut their own mating thread in the ribs 13. By means of a tool similar to an Allen wrench or the like, the core piece 16 can be rotated, and thereby its axial position with respect to the coil wound in the groove 14 can be adjusted to tune the coil.

The cage 12 consists essentially of two longitudinal extensions 17 and 18 which, at their remote ends, are connected by a ring 19. It will be observed that in the position of FIG. 2, the ring 19 forms an abutment, the function of which will be described hereinafter.

The outer or second coil form is shown in FIGS. 4 and 5. This coil form is also tubular and is provided with a helical groove 20 in which a coil may be wound and the heat sealing elements 21 similar to those indicated at 15 in FIG. 2. Internal longitudinal ribs 22 extend under the coil support portion and all the way to the right-hand end as shown in FIG. 4. These ribs perform the same function as the ribs 13 in that the core piece 23 is externally threaded and is simply screwed into position cutting its own threads in the ribs 22.

While in the inner coil form only three ribs 13 were shown, in the outer coil form four ribs 22 are shown disposed in two pairs relatively closely spaced and diametrically opposite each other so as to leave a relatively large unobstructed space on each side. This unobstructed space is provided to accommodate the members 17 and 18 of the cage 12 of the inner member. At the right-hand end of the outer coil form, there is provided a ridge 24 which serves as a manually engageable member, and at the left-hand end a cleat 25 is provided. It will be noted that an internal shoulder is provided at 26 and this shoulder in assembly can abut the shoulder 27 (FIG. 2).

The inner and outer coil forms are assembled as shown in FIG. 8. Because of the temporary deformability of the material of which the coil forms are made, the member 19 can be snapped through the end of the outer coil form, and it will then serve as a stop to movement of the outer coil form to the right as seen in FIG. 8. Movement to the left of the outer coil form on the inner coil form is limited by abutment of the shoulder 26 against the shoulder 27 as heretofore mentioned. In FIG. 8, a coil 27 is shown as being wound on the inner coil form and the coil 28 is wound on the outer coil form. The ends of the coil 29 are sealed down as at 21, and the ends of the coil 27 are sealed down as at 15.

As clearly shown in FIG. 8, the wires from the coil 28 are wound on opposite directions around the cleat 25 and then are connected with slack, as indicated at 29 and 30 to the terminal lugs 31. The wires from the ends of the coil 27, which are indicated at 32 and 33 are connected to the terminal lugs 34 as seen in FIG. 8a. By virtue of the slack in the leads 29 and 30, the outer coil form may be telescoped back and forth over the inner coil form.

One of the lugs 31 is shown in considerable detail in FIG. 6, although the construction of the lug does not constitute a part of the invention. These lugs are provided with stamped out piercing elements 31a and they are driven into the material of the base portion 10 in the manner of staples so that the ends crimp over as best seen in FIG. 7.

In a slight modification of the invention, use may be made of an adjusting element as shown in FIG. 9. This is simply a hollow element having a ring 40 by means of which it may be turned and threaded over its major portions as at 41. An annular groove 42 is provided and at the left-hand end adjacent the groove 42 is a ring 43. The threads 41 engage the elements 44 (FIG. 3) which are located on the inside of the ring 19. The ring 43 is snapped behind the projections 45 which are inside the ring 40. The projections 45 thus engage in the groove 42 and hold the adjusting element of FIG. 9 in fixed axial relationship to the outer coil form of FIG. 4. Thus, when the elements are assembled as best seen in FIG. 10, either the inner coil form may be held with one hand at the base 10, or the outer coil form may be held. When the ring 40 is rotated, relative movement between the inner and outer coil forms axially or telescopingly is achieved. In this way, adjustment of the coupling of the two coils is very simple.

Once the axial position of the two coils with respect to each other (i.e., their coupling) has been adjusted, it is desirable to fix them in the adjusted position. This may be accomplished in a variety of ways, one of which involves a perforation 50 in the outer coil form. The position of the aperture 50 is such that it will be over one of the extension 17 or 18. When the adjustment of coupling has been completed, it is only necessary to apply the end of an iron, such as a soldering iron, to the aperture 50, whereby the two coil forms are fused together at this point. Thus, the adjustment of the coils with respect to each other is fixed.

A second and considerably simplified embodiment of the invention which differs in specific detail is shown in FIGS. 11 to 19, inclusive. For simplification and clarification the iron cores have been omitted from the coil forms and the windings and the connection to the terminal lugs as well as the terminal lugs themselves have also been omitted. It will be understood, however, that in the embodiment of FIGS. 11 to 19 a coil is wound on each of the two coil forms and the leads of the coils are connected to a set of terminal lugs as was clearly shown and described in the embodiment of FIGS. 1 to 10. Likewise, the iron core is provided in each of the coil forms as was the case in the previously described embodiment.

Again the transformer consists of three elements shown in the exploded view of FIG. 11. A first coil form is indicated generally at 100. A second coil form element is indicated generally at 101 and an adjusting member is indicated generally at 102. The element 100 comprises a relatively large tubular base portion 103, a tubular coil support proper 104, and guide members 105 extending from the coil support. The guide fingers terminate in the outwardly extending lips 106 separated from the fingers by the necks 107. It will be understood that a coil of wire is wound on the coil support portion 104, the wires lying in the threads of the coil support portion.

Interiorly of the coil support portion are found the radial ribs 108 which are preferably disposed at 120° intervals and these ribs have the relatively small terminal ridges 109 in which the threads of the iron core cut a mating thread as was described in connection with the first embodiment. For convenience and simplification, the iron core has been omitted but it will be understood that an iron core having a position diameter to intersect the members 109 is threaded into the coil support 104 by means of an Allen wrench type tool as described in connection with the first embodiment. It will also be understood that terminal lugs such as those shown at 34 in connection with the first embodiment are secured to the base portion 103.

The second coil form element 101 is also tubular and provided with threads 110 on which the second coil is wound. It may be provided with a cleat 111 for securing the leads as described in connection with the cleat 25 in the first embodiment.

Internally of the member 101 there are provided pairs of inwardly extending ridges best seen at 112 in FIG. 3 and again it will be understood that the iron core within the member 101 will cut its own threads in the ridges 112 for adjustment of the core within the coil form. It will be noted that the pairs of ridges 112 are diametrically opposed and rather closely spaced to leave relatively large arcs between the pairs. These arcs permit passage of the guide fingers 105 of the member 100.

It will also be noted that the threads 101 for the member 100 extend not only over the portion on which a coil is to be wound but extend all the way to the end 113.

The third element of the transformer of this embodiment is an adjusting member 102. This member is basically a cap member having an extension 114 provided with a hexagonal or similar bore 115 to accept a hexagonal tool. The member 102 is provided with the annular groove 116 having the annular lips 117 and also has an internal single thread 118 adapted to engage the threads 110 on the member 101.

In assembling the embodiment of FIGS. 1 and 19, an iron core similar to those shown at 16 and 23 in the embodiment of FIGS. 1 to 10 is inserted into the member 100 so that its external threads cut into elements 109 and position the core piece in association with the coil wound on the coil support 104. Similarly, a core piece is inserted into the member 101 so as to cut its own threads in the elements 112 so that the core may be positioned with respect to the coil on the coil support 110. The member 101 is then telescoped over the member 100 with the guide fingers 5 extending in the arcuate spaces between the pairs of members 112 of the member 101. The member 102 is then engaged with its single thread 118 engaging the threads 110 and when the assembly 101, 102 is pushed home with respect to the member 103, the lips 106 on the guide fingers 105 snap over the lip 117 on the member 102 and enter into the groove 116.

In this condition, when the member 102 is turned with respect to the member 103 the member 101 is caused to move axially in telescoping engagement with respect to the member 103 without rotation since the guide fingers 105 in the spaces between the pairs of elements 112 prevent relative rotation between the elements 101 and 100.

In the assembled condition, it will be noted that the individual core pieces may be adjusted as described above in connection with the embodiment of FIGS. 1 to 10, each with respect to the coil with which it is associated, thus tuning the two coils. The coupling of the two coils may then be adjusted by rotating the member 102 with respect to the member 100 and such adjustment does not disturb the tuning of either of the coils.

It will be understood that numerous modifications may be made without departing from the spirit of the invention, and that no limitations on the invention are intended or should be implied unless they are specifically set forth in the claims. By virtue of the fact that coupling of the coils can be adjusted without affecting the tuning of either coil, the adjustment of couplings in the communications equipment is made practicable from a commercial standpoint. The adjustments can now be made more quickly and more accurately and with labor of a lower order of skill and training.

The embodiments of the invention in which an exclusive property or privilege is claimed are defined as follows.

I claim:

1. A transformer for communications equipment and the like, having two inductively coupled coils, each coil being wound on a separate tubular coil form and having an axially displaceable iron core whereby it may be tuned, one of said coil forms being telescopingly disposed within the other, and means for axially adjusting one of said coils and the core therein with respect to the other coil and the core in said other coil, without relative displacement of either core in its coil, to adjust the coupling of said coils without disturbing the tuning thereof.

2. A transformer according to claim 1, wherein an adjusting member is provided, said member having threaded engagement with one of said forms, and being secured to the other of said forms against axial movement but free for rotational movement, whereby upon rotation of said adjusting member, a relative telescoping movement of one of said forms with respect to the other is accomplished.

3. A transformer according to claim 2, wherein a first coil form is provided with a relatively large tubular base portion having terminal lugs for the two coils, a coaxial tubular coil support and a guide cage extending from said coil support and terminating in a stop member, the base portion and coil support having continuous, longitudinal, internal core engaging ribs, an externally threaded iron core in threaded engagement with said ribs, and the coil on said coil support having its ends connected to two of said terminal lugs.

4. A transformer according to claim 2, wherein a second tubular coil form is provided with a coil support, a manually engageable element at one end, and a cleat adjacent the other end, longitudinal internal ribs extending from said one end and throughout the length of said coil support, an externally threaded iron core in threaded engagement with said ribs, and a coil on said coil support.

5. A transformer according to claim 4, wherein there are at least two pairs of internal ribs diametrically opposite each other, the ribs of each pair being closely spaced to leave diametrically opposed unobstructed areas.

6. A transformer according to claim 1, wherein a first coil form is provided with a relatively large tubular base portion having terminal lugs for the two coils, a coaxial tubular coil support and a guide cage extending from said coil support and terminating in a stop member, the base portion and coil support having continuous longitudinal internal core engaging ribs, an externally threaded core in threaded engagement with said ribs, and a coil on said coil support having its ends connected to two of said terminal lugs; and a second tubular coil form is provided with a coil support, a manually engageable element at one end, and a cleat adjacent the other end, and longitudinal internal ribs extending from said one end throughout the length of said coil support, there being at least two pairs of internal ribs diametrically opposite each other, the ribs of each pair being closely spaced to leave diametrically opposed unobstructed areas, an externally threaded iron core in threaded engagement with said ribs, and a coil on said coil support, the wires from the ends of said coil being wound around said cleat and connected to two of said terminal lugs with slack between said cleat and lugs; the coil support and guide cage of said first coil form being in telescoping engagement within the second coil form, with the extending portions of said guide cage disposed in said unobstructed areas of said second coil form, and with said stop member of said first coil form disposed outside said manually engageable element of said second coil form.

7. A transformer according to claim 6, wherein an external shoulder is provided on said first coil form, and an internal shoulder is provided on said second coil form to limit the extent of telescoping movement of said second coil form toward the base of said first coil form.

8. A transformer according to claim 2, wherein a first coil form is provided with a relatively large tubular base portion having terminal lugs for the two coils, a coaxial tubular coil support and a pair of guide fingers extending from said coil support and each terminating in an outwardly extending lip, the base portion and coil support having continuous, longitudinal, internal core engaging ribs, an externally threaded iron core in threaded engagement with said ribs, said core having a tool engageable socket whereby it may be turned to move it longitudinally of said coil support for tuning, and a coil on said support having its ends connected to two of said terminal lugs.

9. A transformer according to claim 2, wherein a second tubular coil form is provided having an external continuous thread extending over a major portion including one end thereof, longitudinal internal ribs coextensive with said thread, and a cleat member on the unthreaded portion thereof, an externally threaded iron core in threaded engagement with said ribs, said core having a tool engageable socket whereby it may be turned to move it longitudinally of said coil support for tuning, and a coil on a portion of said continuos thread, the leads from said coil being secured to said cleat.

10. A transformer according to claim 9, wherein there are at least two pairs of internal ribs diametrically opposite each other, the ribs of each pair being closely spaced to leave diametrically opposed unobstructed areas.

11. A transformer according to claim 2, wherein a first coil form is provided with a relatively large tubular base portion having terminal lugs for the two coils, a coaxial tubular coil support and a pair of guide fingers extending from said coil support and each terminating in an outwardly extending lip, the base portion of said coil support having continuous, longitudinal, internal core engaging ribs, an externally threaded iron core in threaded engagement with said ribs, and a coil on said coil support having its ends connected to two of said terminal lugs; and a second tubular coil form is provided with an external, continuous thread extending over a major portion including one end thereof, two pairs of diametrically opposed longitudinal internal ribs coextensive with said thread, the ribs of said pairs being closely spaced to leave diametrically opposed unobstructed areas, an externally threaded iron core in threaded engagement with said ribs, a coil on a portion of said continuous thread remote from said threaded end, and a cleat on the unthreaded portion thereof, the ends of said last named coil being secured to said cleat, and connected to two of said terminal lugs with slack between said cleat and lugs; the guide fingers of said first coil form being in telescoping engagement within said second coil form with said guide fingers of said first coil form disposed in said unobstructed areas of said second coil form; and a cup-like adjusting member having a single internal thread engageable with the external thread on said second coil form, and having an annular groove with an annular inwardly extending lip, the outwardly extending lips of said first coil form being seated in said last named groove beyond said annular lip, whereby said adjusting member is rotatably but axially immovably secured to said first coil form; whereby upon rotation of said adjusting member with respect to said first coil form, said second coil form is caused to move axially in telescoping relation to said first coil form.

12. A transformer for communications equipment and the like, comprising two coil forms, one in telescoping relation to the other, with means to limit the telescoping movement in both directions, a coil on each coil form, an iron core in each coil form, and means for adjusting the axial position of each core with respect to its coil, terminal lugs on the inner one of said coil forms, the ends of the coil on said inner form being connected to two of said lugs, means securing the wires from the ends of the coil on the outer one of said forms to said outer form, said last named wires being connected to two of said lugs with slack between said last named lugs and said securing means.

13. A transformer according to claim 12, having means for locking said two coil supports to each other in any position of adjustment.

14. A transformer according to claim 12, wherein an adjusting member is provided, said member having threaded engagement with one of said forms and being secured to the other of said forms against axial movement but free for rotational movement, whereby upon rotation of said adjusting member, a relative telescoping movement of one of said forms with respect to the other is accomplished.

References Cited

UNITED STATES PATENTS

| | | | |
|---|---|---|---|
| 2,445,979 | 7/1948 | Thompson | 336—119 XR |
| 3,355,687 | 11/1967 | Adams | 336—136 |

LEWIS H. MYERS, *Primary Examiner.*

T. J. KOZMA, *Assistant Examiner.*

U.S. Cl. X.R.

336—131, 136, 129